United States Patent [19]

Kwon et al.

[11] Patent Number: 5,214,521
[45] Date of Patent: May 25, 1993

[54] PLASMA ADDRESSED LIQUID CRYSTAL DISPLAY WITH GROOVES IN MIDDLE PLATE

[75] Inventors: Ki-duck Kwon; Seung-woo Lee, both of Seoul, Rep. of Korea

[73] Assignee: Samsung Electron Devices Co., Ltd., Kyungki, Rep. of Korea

[21] Appl. No.: 913,181

[22] Filed: Jul. 14, 1992

[30] Foreign Application Priority Data

Oct. 26, 1991 [KR] Rep. of Korea ............... 91-18948

[51] Int. Cl.$^5$ ............... G02F 1/133; G02F 1/1343; G09G 3/22; G09G 3/28
[52] U.S. Cl. ............... 359/54; 359/87; 340/771; 315/169.4; 365/116
[58] Field of Search ............... 359/50, 55, 54, 84, 359/87; 340/769, 771, 794; 313/484, 491; 315/169.4, 169.1; 365/116

[56] References Cited

U.S. PATENT DOCUMENTS

| | | | |
|---|---|---|---|
| 4,853,590 | 8/1989 | Andreadukis | 313/485 |
| 4,896,149 | 1/1990 | Buzak et al. | |
| 5,032,768 | 7/1991 | Lee et al. | 313/582 |
| 5,077,553 | 12/1991 | Buzak | 340/794 |

Primary Examiner—William L. Sikes
Assistant Examiner—Kenneth Parker
Attorney, Agent, or Firm—Leydig, Voit & Mayer

[57] ABSTRACT

A plasma addressed liquid crystal display in which the structure of the plasma address portion is improved is disclosed. In the plasma address portion of the present liquid crystal display, a plurality of independent parallel discharge spaces are formed by the grooves formed on a middle plate, and each pair of second electrodes formed by a screen printing are formed to be opposed on the groove. The liquid crystal display has advantages of easy manufacturing of a low cost.

6 Claims, 2 Drawing Sheets

PLASMA ADDRESSED LIQUID CRYSTAL DISPLAY WITH GROOVES IN MIDDLE PLATE

BACKGROUND OF THE INVENTION

The present invention relates to a plasma addressed liquid crystal display, and more particularly to a plasma addressed liquid crystal display having a plasma address portion of an improved structure, thereby having an improved manufacturing.

There are several types of display devices such as a conventional cathode ray tube using a high speed electron beam, a vacuum fluorescent display using low speed electron beam, a plasma display using gas discharge, an electro-luminescence (the so-called E.L) display, a liquid crystal display using the electro-optic effect, etc. These display devices are different in function and structural characteristics, so that according to their characteristics, they have been selectively applied.

The common point of these display devices is in that an electrical picture signal or data signal, etc. is visualized. In various ways, the structures and functions are improved and developed.

Recently, a new matrix-type display which is constituted by the combination of a plasma discharge display, and an electro optic display, i.e. a liquid crystal display, is disclosed in U.S. Pat. No. 4,896,149 by Tektronix. This display in which one line is addressed by plasma discharge is structured in such a way that, as shown in FIG. 1, a liquid crystal shutter 10 where a plurality of stripe-like pixel electrodes 14 are arranged in parallel is lapped over a plasma addressing portion 20 where a plurality of unit discharge lines 21 are arranged perpendicular to the stripe-like pixel electrodes 11 of the liquid crystal shutter 10. An ordinary back light generator (not shown) is provided at the rear of plasma addressing portion 20.

In detail with reference to FIG. 2, first of all, in the liquid crystal shutter 10, a liquid crystal 16 is injected between two plates, i.e., transparent front plate 12 and middle plate 13, and a stripe-like pixel electrode 14 is formed on the inner surface of the front plate 12. In the plasma addressing portion 20, a plurality of grooves 24 for forming a discharge line 21 in perpendicular to the strip-like pixel electrodes 14 are formed in parallel on the rear plate 25, and a pair of electrodes 22 and 23 are provided on the both bottom sides of each groove 24. The rear plate 25 is closely adhered to the middle plate 13 of the liquid crystal shutter 10, so that the groove 24 forms a sealed discharge space, where a discharge gas is filled.

In liquid crystal shutter 10, since a data signal is applied to a selected pixel electrode 14, a potential for activating the liquid crystal is formed along a selected pixel electrode 14. In plasma addressing portion 20, according to the ionized state of each discharge line due to the plasma discharge of each sequentially-selected plasma scanning line 21, a positive potential for activating the liquid crystal 16 is formed linearly along scanning line 21 on middle substrate 13 in contact with the liquid crystal. Accordingly, a potential difference is formed by a selected pixel electrode 14 of liquid crystal shutter 10 and scanning line 21 of plasma addressing portion 20. Liquid crystal 16 positioned at the intersection is activated and oriented by the potential difference at the interconnection, which forms a light passing area through which light from the rear ward back light generator passes.

In other words, in plasma addressing portion 20, when voltage of a predetermined potential is applied to a pair of parallel electrodes 22 and 23 on a sequentially selected scanning line, linear direct-current-discharge occurs between parallel electrodes 22 and 23. Due to this, a linear ionization region is formed along scanning line 21 on the thinner middle substrate 13. When the linear ionization region is formed on middle substrate 13 by the linear discharge on scanning line 21 selected by the scanning signal a data signal is selectively applied to data electrode 14 of the upper liquid crystal shutter 10. When liquid crystal is then activated by the potential difference at the intersection of the selected data electrode 14 and the selected and discharged scanning line 21 and is locally re-arranged, back light passes, forming one picture point.

Such a display is a planar display of special type in which a liquid crystal is oriented by the pixel electrode and the discharge line, and has the following disadvantages. As described above, since the structure of the addressing portion is based on the grooves 25 formed on the rear plate and the extra material sealing it, for instance, the middle plate 13 of the above liquid crystal shutter, its manufacturing process is very complicated. Moreover, the thickness of the middle plate is about 50 $\mu$m or less, so that there is a high probability of being broken during handling. Thus, the maximum size of the middle plate is limited.

Meanwhile, since the electrode for plasma discharge is formed on the bottom of the groove of the rear plate, its manufacturing is very difficult. Accordingly, the manufacturing process has difficulties in that this conventional liquid crystal display cannot be applied with the convenient electrode manufacturing method such as the general silk screen printing method.

SUMMARY OF THE INVENTION

It is an object of the present invention to provide a plasma addressed liquid crystal display which has the low cost of production and can be easily manufactured by changing the structure of middle plate.

To achieve the object, the present invention comprises:

a transparent front plate, middle plate, a and a rear plate disposed with each separated by a predetermined distance;

a plurality of parallel stripe-like first electrodes and a liquid crystal layer sequentially provided on said front plate;

grooves on said middle plate which include an open portion which faces said; said perpendicular to said first electrodes, said middle plate and said rear plate attached together such that discharge spaces are defined by said grooves and a flat surface of said rear plate, said discharge spaces filled with an ionizable gas; and at least two electrodes spaced from each other on said rear plate disposed within each of said grooves wherein the ionizable gas and said first electrodes cooperate to form an addressing matrix.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 1:
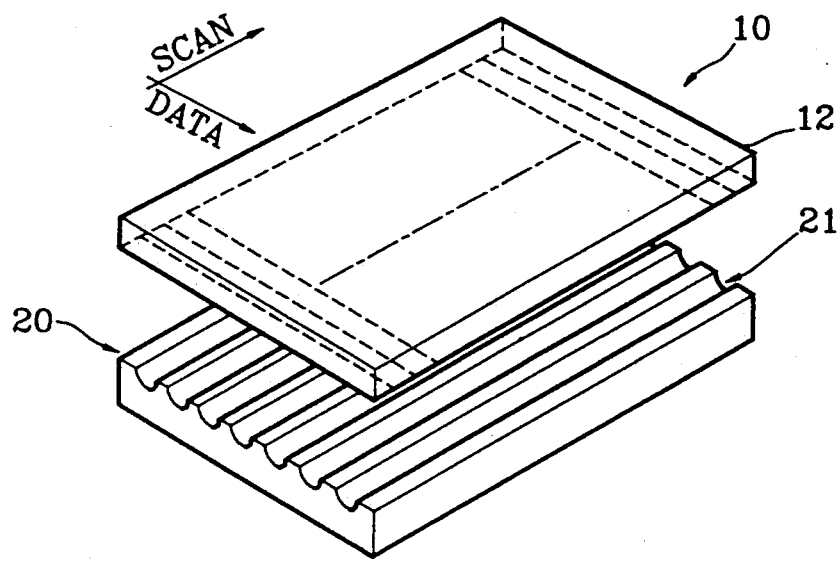
FIG. 1 is a schematic exploded view of conventional plasma addressed liquid crystal display.
Figure 2:
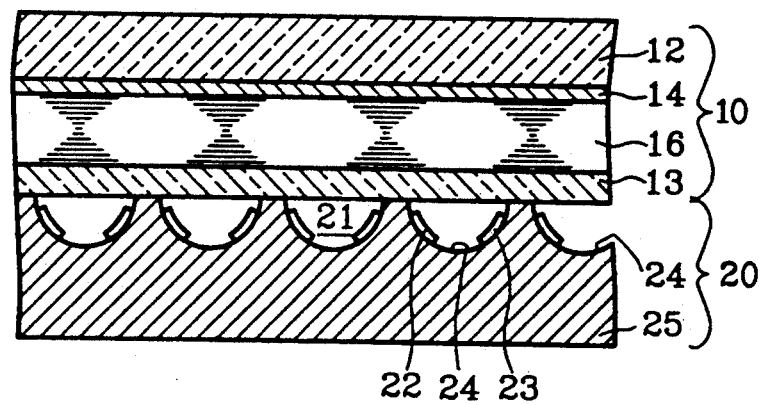
FIG. 2 is a partially enlarged and extracted sectional view of the display device shown in FIG. 1.
Figure 3:
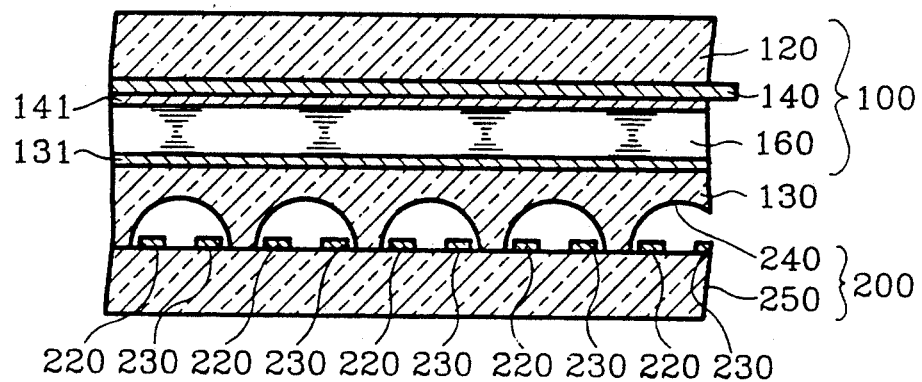
FIG. 3 is a schematic sectional view of the plasma addressed liquid crystal display according to the present invention.

Referring to FIG. 3, a plasma addressed liquid crystal display of the present invention is divided into a liquid crystal shutter portion 100 and a plasma addressing portion 200. A back light generator (not shown) is provided at the rear of plasma addressing portion 200.

Transparent front and rear plates 120 and 250 are separated from each other by a predetermined distance, thereby protecting a function layer disposed between them. A plurality of stripe-like first electrodes 140 are disposed in parallel on the front plate 120, and a liquid crystal layer 160 in contact with the electrodes, and a middle plate 130 are sequentially provided. As in an ordinary liquid crystal display, orientation layers 141 and 131 are provided on the inner side of front and middle substrates 120 and 130. A plurality of parallel semicircular grooves 240 are formed perpendicular to the first electrodes on the side of the middle plate 230 opposite to the liquid crystal 160. A pair of second electrodes 220 and 230 positioned at each discharge space divided by the grooves 240 are provided on the rear plate 250 closely adhered to the middle plate 240 formed with the grooves 240. The middle plate provided with the grooves can be manufactured using general soda lime glass. The thickness of the middle plate is hundreds of micrometers which is much thicker than that needed for the excitation of liquid crystal, and the middle plate is etched, so that the bottom thickness of the groove has about 50 μm as desired. The etching of the groove can be done not for the whole middle plate, but locally for the region needed for the discharge. For instance, the etching for outmost edge of middle plate unrelated with the image display is not needed. While in the disclosed embodiment, the bottom thickness of the groove is about 50 μm, it can be lower than 50 μm if the strength of middle plate allows.

As described above, in the liquid crystal display of the present invention, according to the structural characteristic of the plasma addressing portion, the pair of second electrodes 220 and 230 disposed within the groove 240 functions as cathode and anode. Accordingly, the direct current discharge for addressing is generated within each groove 24, so that electric field is formed on the liquid crystal layer 160 adjacent to the corresponding discharge space, and the passage of the light generated from the back light generator is allowed by orienting the liquid crystal disposed at the cross of the first electrode supplied with the data pulse.

In contrast to the conventional liquid crystal display, the second electrode of the instant liquid crystal display is formed on the plane rear plate, so that the liquid crystal display of the present invention having the above structure and operation can be easily manufactured. That is, grooves are formed on the middle plate, and a pair of second elecrrodes disposed in each of the grooves are formed on the rear plate in contact with the middle plate, thereby completing the formation of the functional elements on the middle plate and rear plate, so that the problems according to the formation of the electrode within the groove as in the conventional liquid crystal display are not raised. Moreover, since the second electrode can be formed on the rear plate, it can be formed by the screen printing method (the so-called thick film process) using nickel paste which has a strong resistance for ion bombardment, and also the products can be mass-produced and the poor products according to the formation of the second electrode can be remarkably reduced.

Moreover, the present liquid crystal display has advantages in price, because the general glass material of low cost can be applied to the middle plate. In detail, the conventional middle plate is made by a special material having a very thin and uniform thickness on the whole, so that the cost is very high and the maximum size cannot be larger than a constant size. However, the middle plate of the present liquid crystal display has an advantage in that it can be made from general glass of very low cost by a general etching process. Also, since the middle plate of the present liquid crystal display is thicker on an average than the conventional one, its strength is relatively higher than that of the conventional middle plate. Accordingly, the maximum size of the middle plate can be larger, thereby sharply reducing the number of middle plates used in the manufacturing process, so that the liquid crystal display can be easily manufactured.

What is claimed is:

1. A plasma addressed liquid crystal display comprising:
   a transparent front plate, a middle and rear plate each separated by predetermined distance;
   a plurality of parallel stripe-like first electrodes and a liquid crystal layer sequentially provided on said front plate;
   grooves formed on said middle plate which include an open portion which faces said rear plate said grooves extending perpendicular to said first electrodes, said middle plate and said rear plate attached together such that discharge spaces are defined by said grooves and a flat surface of said rear plate, said discharge spaces filled with an ionizable gas; and
   at least two electrodes spaced from each other on said rear plate disposed within each of said grooves wherein the ionizable gas and said first electrodes cooperate to form an addressing matrix.

2. A plasma addressed liquid crystal display as claimed in claim 1, wherein one of said at least two electrodes is formed on said rear plate by a silk screen method.

3. A plasma addressed liquid crystal display as claimed in claim 2, wherein one of said at least two electrodes comprises nickel paste.

4. A plasma addressed liquid crystal display comprising:
   a transparent front plate;
   a middle plate spaced from said front plate by a predetermined distance;
   a plurality of parallel stripe-like first electrodes provided on a surface of said front plate;
   a liquid crystal layer sandwiched between said front plate and said middle plate;
   a plurality of grooves formed in said middle plate extending parallel to each other and perpendicular to said first stripe-like electrodes;
   a rear plate attached to said middle plate such that a surface of said rear plate faces said plurality of grooves thus defining a plurality of discharge spaces, the discharge spaces being filled with ionizable gas;

a plurality of first electrodes disposed on the surface of said rear plate that faces said plurality grooves such that each of said plurality of first electrodes is disposed within one of said plurality of grooves; and a plurality of second electrodes disposed on the surface of said rear plate that faces said plurality of grooves such that each of said plurality of second electrodes is disposed within one of said plurality of grooves, said ionizable gas and said first electrodes cooperating to form an addressing matrix for said liquid crystal layer.

5. A plasma addressed liquid crystal display as claimed in claim 4 wherein said plurality of second electrodes are formed on the rear plate by a silk screen method.

6. A plasma addressed liquid crystal display as claimed in claim 5, wherein said second electrode comprises a nickel paste.

* * * * *